United States Patent
Zhou et al.

(10) Patent No.: US 12,130,996 B2
(45) Date of Patent: Oct. 29, 2024

(54) USING MOUSEOVER TO SCAN A GRAPHICAL USER INTERFACE TO IMPROVE ACCURACY OF GRAPHICAL OBJECT RECOGNITION

(71) Applicant: MICRO FOCUS LLC, Santa Clara, CA (US)

(72) Inventors: Gaoyang Zhou, Shanghai (CN); Peng-Ji Yin, Shanghai (CN); Chengzhe Xu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/881,300

(22) Filed: Aug. 4, 2022

(65) Prior Publication Data

US 2024/0045561 A1    Feb. 8, 2024

(51) Int. Cl.
G06F 3/048    (2013.01)
G06F 3/04812    (2022.01)
G06F 3/04842    (2022.01)
G06F 11/36    (2006.01)

(52) U.S. Cl.
CPC ...... G06F 3/04812 (2013.01); G06F 3/04842 (2013.01); G06F 11/36 (2013.01)

(58) Field of Classification Search
CPC ............... G06F 3/0481; G06F 3/04812; G06F 11/3664; G06F 11/3668
See application file for complete search history.

(56) References Cited

U.S. PATENT DOCUMENTS

| | | | | |
|---|---|---|---|---|
| 5,819,301 A * | 10/1998 | Rowe | ............... | G06F 40/123 |
| | | | | 707/999.2 |
| 8,510,675 B1 * | 8/2013 | Jitkoff | ............... | G06F 3/0481 |
| | | | | 715/764 |
| 9,424,167 B2 * | 8/2016 | Lee | ............... | G06F 3/0484 |

(Continued)

FOREIGN PATENT DOCUMENTS

| CN | 106575203 | 4/2017 |
|---|---|---|
| CN | 111460355 A | 7/2020 |
| CN | 110020344 B | 12/2021 |

OTHER PUBLICATIONS

Leanix; "The Definitive Guide to Cloud Tagging"; https://www.leanix.net/en/wiki/vsm/cloud-tagging; 2022; 14 pages.

(Continued)

*Primary Examiner* — Patrick F Riegler
(74) *Attorney, Agent, or Firm* — Sheridan Ross P.C.

(57) ABSTRACT

An area of a graphical user interface that potentially comprises an actionable graphical object is identified. An actional graphical object is an object that generates an event when clicked on. For example, an actional graphical object may be a button, a menu, a menu item, a check box, a text field, a text area, a tab, and/or the like. A cursor movement is generated in the area of the graphical user interface (e.g., using a grid). The cursor movement uses a scanning process to a detect a change in a cursor type (e.g., from an arrow cursor to a link cursor). In response to detecting the change in the cursor type, the actionable graphical object is identified in the area of the graphical interface. The actionable graphical object may then be integrated into a testing process to validate the graphical user interface.

20 Claims, 6 Drawing Sheets

(56) References Cited

U.S. PATENT DOCUMENTS

| | | | |
|---|---|---|---|
| 9,594,489 B2 | 3/2017 | Niranjani | |
| 9,747,083 B1* | 8/2017 | Roman | H04L 12/2816 |
| 10,203,852 B2 | 2/2019 | Ellbogen | |
| 11,334,897 B2* | 5/2022 | Rathod | G06F 16/58 |
| 11,366,645 B2* | 6/2022 | Magureanu | G06N 3/006 |
| 2002/0035619 A1* | 3/2002 | Dougherty | H04L 67/565 |
| | | | 709/219 |
| 2002/0075332 A1* | 6/2002 | Geilfuss, Jr. | G06Q 30/02 |
| | | | 715/859 |
| 2003/0074112 A1* | 4/2003 | Weimper | B60K 35/00 |
| | | | 701/1 |
| 2005/0088410 A1* | 4/2005 | Chaudhri | G06F 3/04812 |
| | | | 345/157 |
| 2006/0238515 A1* | 10/2006 | Ohshita | G06F 3/0481 |
| | | | 345/173 |
| 2007/0043701 A1* | 2/2007 | Klementiev | G06F 9/451 |
| 2008/0189264 A1* | 8/2008 | Cochran | G06F 16/24535 |
| | | | 707/999.005 |
| 2011/0072399 A1* | 3/2011 | Kim | G06F 3/0346 |
| | | | 715/858 |
| 2013/0055126 A1* | 2/2013 | Jackson | G06F 3/04845 |
| | | | 715/769 |
| 2016/0274683 A1* | 9/2016 | Nicholson | G06F 3/0346 |
| 2018/0197103 A1* | 7/2018 | Petursson | G06N 20/00 |
| 2020/0167058 A1* | 5/2020 | Ragan, Jr. | G06F 3/03543 |
| 2021/0271588 A1* | 9/2021 | Shang | G06F 11/3664 |
| 2023/0063802 A1* | 3/2023 | Gursha | G06F 16/951 |
| 2023/0100689 A1* | 3/2023 | Chiu | G06F 3/04815 |
| | | | 345/157 |
| 2023/0153126 A1* | 5/2023 | Li | G06F 9/451 |
| | | | 715/859 |

OTHER PUBLICATIONS

Wikipedia; "Configuration Management Database"; https://en.wikipedia.org/wiki/Configuration_management_database; Jun. 20, 2022; 4 pages.

* cited by examiner

USING MOUSEOVER TO SCAN A GRAPHICAL USER INTERFACE TO IMPROVE ACCURACY OF GRAPHICAL OBJECT RECOGNITION

FIELD

The disclosure relates generally to application testing and particularly to improving the accuracy of recognition of graphical objects in the testing process.

BACKGROUND

Artificial Intelligence (AI)/Machine Learning (ML) algorithms are being used in a variety of places. One of these is for testing software applications. AI/ML is currently used to detect graphical objects in a Graphical User Interface (GUI). However, current AI/ML algorithms sometimes have difficulty in identifying some types of graphical objects. For example, sometimes a clickable object (e.g., a button) is identified as a text object. This limits the ability of the testing process to do a complete test of the software application.

SUMMARY

These and other needs are addressed by the various embodiments and configurations of the present disclosure. The present disclosure can provide a number of advantages depending on the particular configuration. These and other advantages will be apparent from the disclosure contained herein.

An area of a graphical user interface that potentially comprises an actionable graphical object is identified. An actional graphical object is an object that generates an event when clicked on. For example, an actional graphical object may be a button, a menu, a menu item, a check box, a text field, a text area, a tab, and/or the like. A cursor movement is generated in the area of the graphical user interface (e.g., using a grid). The cursor movement uses a scanning process to a detect a change in a cursor type (e.g., from an arrow cursor to a link cursor). In response to detecting the change in the cursor type, the actionable graphical object is identified in the area of the graphical interface. The actionable graphical object may then be integrated into a testing process to validate the graphical user interface.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
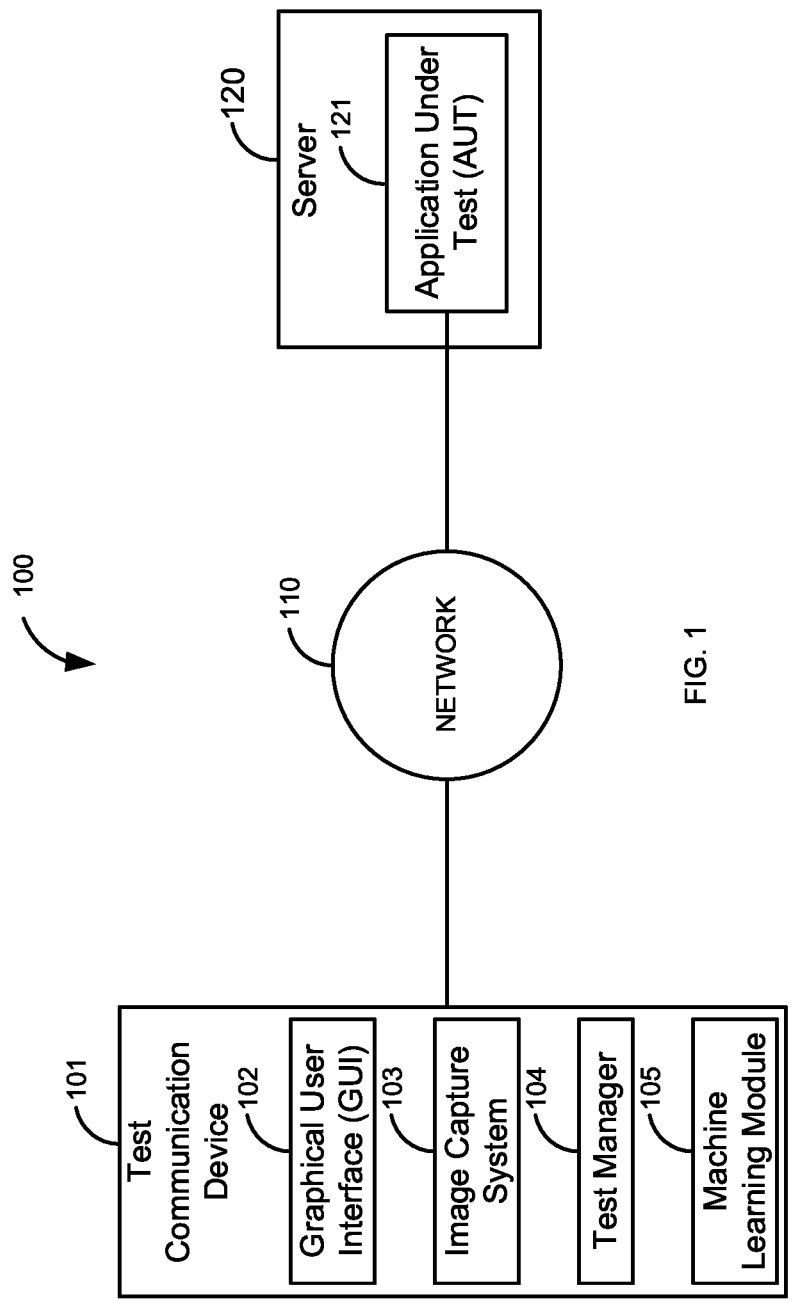
FIG. 1 is a block diagram of a first illustrative system for using mouseover to identify objects in a graphical user interface.

FIG. 1 is a block diagram of a first illustrative system 100 for using mouseover to identify objects in a graphical user interface 102. The first illustrative system 100 comprises a test communication device 101, a network 110, and a server 120.

The test communication device 101 can be or may include any device that can be used to test the application under test 121, such as a Personal Computer (PC), a tablet device, a notebook device, a smartphone, and/or the like. Although FIG. 1 only shows a single test communication device 101, any number of test communication devices 101 may be connected to the network 110 for testing the application under test 121.

The test communication device 101 further comprises a graphical user interface 102, an image capture system 103, a test manager 104, and a machine learning module 105. The graphical user interface 102 can be any graphical user interface 102 that can display graphical information provided by the application under test 121. For example, the graphical user interface 102 may display graphical information of a browser.

The image capture system 103 is used to capture an image of the graphical user interface 102. The image capture system 103 may comprise a camera that captures the graphical user interface 102. Alternatively, the image capture system 103 may analyze graphical data being sent for display on the test communication device 101 in the graphical user interface 102. The image capture system 103 uses a display stream of the graphical user interface 102 to detect changes in the graphical user interface 102. For example, the image capture system 103 may analyze different frames of the display steam to identify changes in the graphical user interface 102.

The test manager 104 is used to identify actionable graphical objects in the graphical user interface 102 based on the detected changes to the graphical user interface 102. An actionable graphical object is a graphical object where a mouse click on the actionable graphical object causes an event. For example, an actionable graphical object may be a button, a scroll bar, a check box, an icon, a link, a tab, a menu, a menu item, a text field, a text area, a slider, a control, and/or the like. The test manager 104 uses the results of detection of actionable graphical objects to run tests against the application under test 121.

The machine learning module 105 may use a variety of machine learning algorithms, such as, supervised machine learning, unsupervised machine learning, reinforcement machine learning, semi-supervised machine learning, self-supervised machine learning, multi-instance machine learning, inductive machine learning, deductive machine learning, transductive machine learning, and/or the like. The machine learning module 105 may be used to learn, over time, which graphical objects that are actionable graphical objects.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 may be any device that can host the application under test 121. For example, the server may be a web server, a cloud service, an application server, an embedded device (e.g., a printer), a communication server, a database server, an email server, and/or the like. The server 120 further comprise the application under test 121.

The application under test 121 may be any type of application that is being tested, such as, a web server application, a banking application, a financial application, a database application, a server application, a communications application, an email application, a social media network application, a security application, a smartphone application, and/or the like. In some embodiments, the application under test 121 may reside in the test communication device 101 or be distributed between the test communication device 101 and the server 120.

Figure 2:
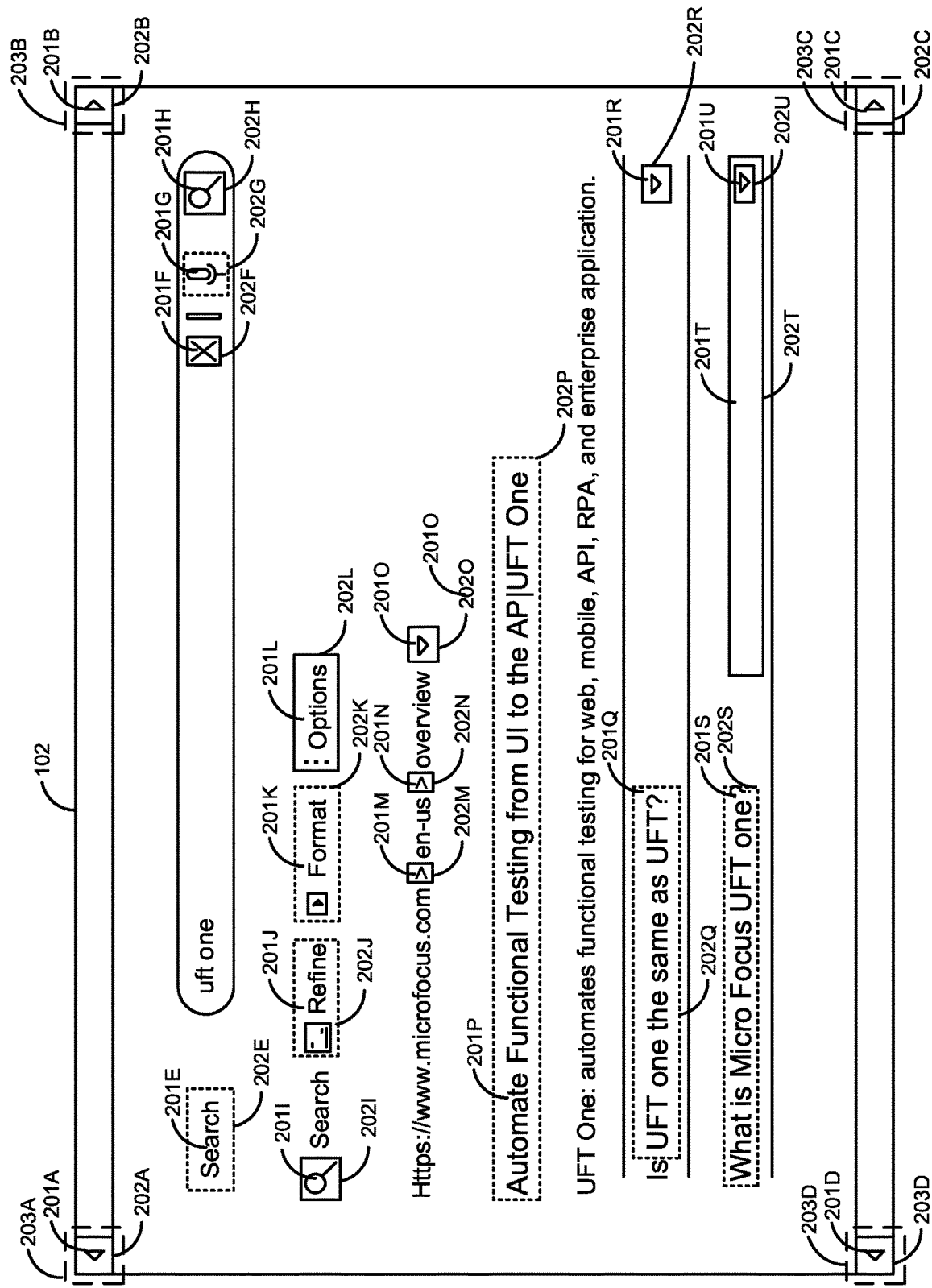
FIG. 2 is a diagram of an exemplary graphical user interface.

FIG. 2 is a diagram of an exemplary graphical user interface 102. The graphical user interface 102 as shown in FIG. 2 is an example of a window. However, the graphical user interface 102 may have multiple windows and/or other graphical objects 201. The graphical user interface 102 comprises graphical objects 201A-201U. Each of the graphical objects 201A-202U have an associated area 202A-202U. The associated areas 202A-202U are generated by a machine learning algorithm that uses learned patterns/images to identify the graphical objects 201A-201U in the graphical user interface 102.

One of the problems with existing machine learning algorithms is that it takes time to learn which of the graphical objects 201A-201U are actually actionable graphical objects. Another issue is where a custom graphical object is used. In order to properly test the application under test 121, it is important to be able to identify all the actionable graphical objects in the graphical user interface 102. If the machine learning algorithm misidentifies an actionable graphical object as non-actionable, this can result in missed tests, which limits testing of the application under test 121.

The machine learning module 105 identifies the areas 202A-202U around the graphical objects 201A-201U. The areas 202 with the small, dashed lines (202E, 202G, 202J, 202K, 202P, 202Q, and 202S) comprise graphical objects (201E, 201G, 201J, 201K, 201P, 201Q, and 201S) that were not recognized by the machine learning algorithm as actionable graphical objects.

The areas 202A-202U/203A-203D may be determined in various ways. For example, a size/shape of the areas 202A-202U/203A-203D may be determined based on a size of the graphical object 201, based on a closeness to another graphical object 201, based on a type of the graphical object 201, based on a location of the graphical object 201 (e.g., a corner object 203), based on a text of the graphical object 201, based on a grid, based on a predefined value, based on an administered value, and/or the like.

The corner areas 203A-203D (with larger dashed lines) are used by the test manager 104 to identify the corners of the window that is displayed in the graphical user interface 102. The corner areas 203A-203D are used by the test manager 104 to test changes in the size of the window using the processes described herein.

Figure 3:
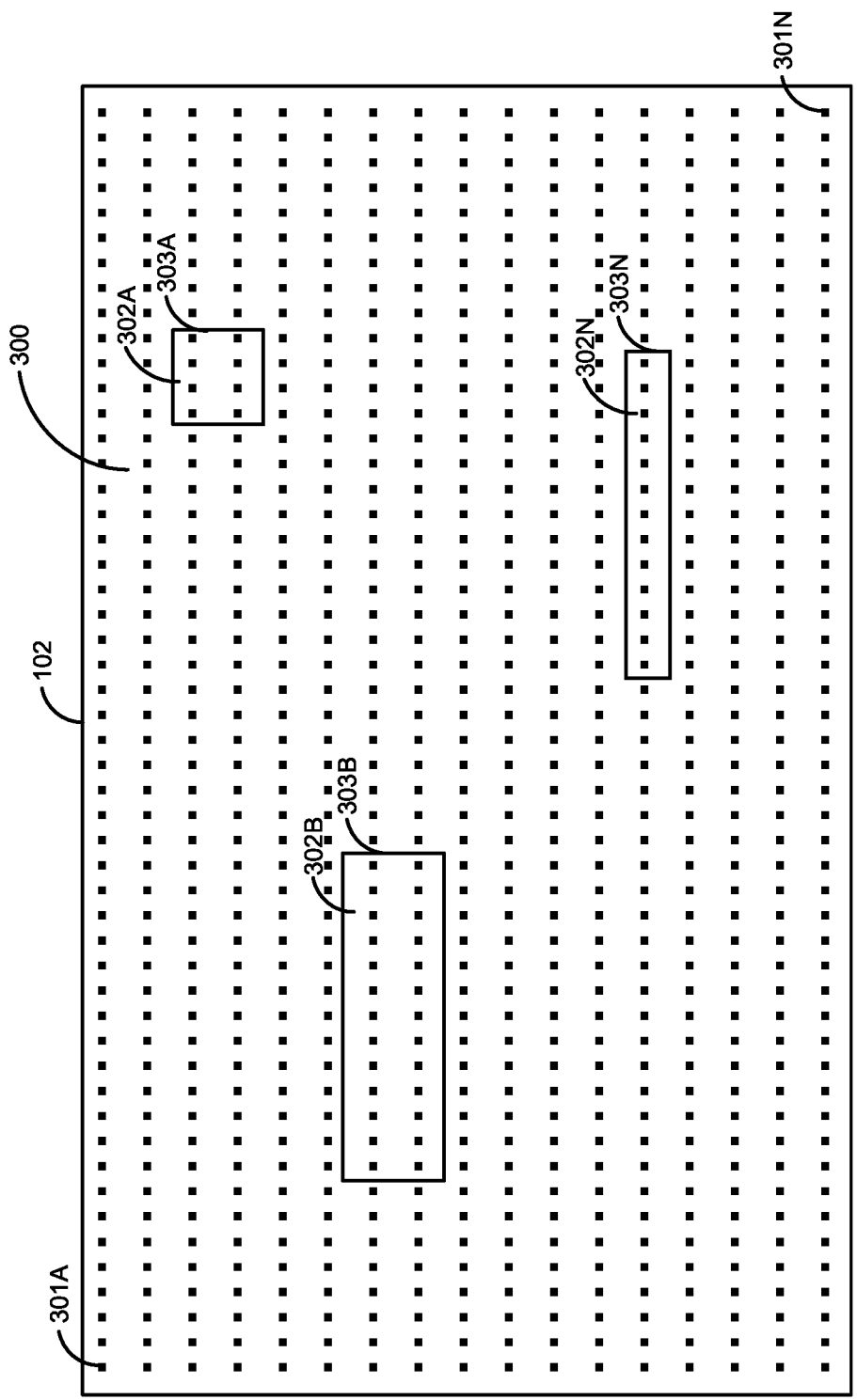
FIG. 3 is a diagram of where a grid is used to identify actionable graphical objects in a graphical user interface.

FIG. 3 is a diagram of where a grid 300 is used to identify actionable graphical objects 302A-302N in the graphical user interface 102. In order to identify actionable graphical objects 302A-302N, the graphical user interface 102 is divided into the grid 300. The grid 300 comprises grid elements 301A-301N. The grid 300 is created by dividing the graphical user interface 102 into a grid 300 (e.g., 100*100 pixels). Although 100*100 pixels is used in this exemplary embodiment, the grid 300 may vary based on implementation. For example, the grid 300 may be 50*50 pixels or 75*50 pixels. In one embodiment, the size of the grid 300 may be administered by a user.

The test manager 104 uses each grid element 301A-301N in the grid 300 as a point to move a cursor over. For example, the test manager 104 starts at grid element 301A and moves the cursor to each grid element 301 until grid element 301N. The test manager 104 may move in a horizontal manner (e.g., row by row), in a vertical manner (e.g., column by column), and/or the like. When the cursor is moved to each grid element 301, the image capture system 103 checks the graphical use interface 102 to determine if the cursor type has changed (e.g., from an arrow cursor to a text cursor) from the previous grid element 301 (a comparison of the two images). Alternatively, the scanning process may start at grid element 301N in a similar manner as above, but in reverse manner. If there is a change, then the graphical object 201 is an actionable graphical object 302. As one of skill in the art would recognize, other methods of using the grid 300 may be envisioned.

By moving the cursor according to the grid 300, the test manager 104 can identify where the cursor changes from a first type of cursor to a second type of cursor. In addition, the boundaries 303A-303N of the actionable graphical objects 302A-302N can be identified using the grid 300. This allows the test manager 104 to create a list of actionable graphical objects 302A-302N for testing the application under test 121 via the graphical user interface 102.

To further illustrate, consider the following examples. As the cursor is moved according to the grid 300, the cursor changes from an arrow cursor to a text select cursor (an editable actionable graphical object 302) or from the arrow cursor to a link select cursor (a clickable actionable graphical object 302). Another example is where the pointer cursor changes one of a vertical resize cursor, a horizontal resize cursor, a diagonal resize one cursor, or a diagonal resize two cursor. Identification of two or more of these can be used to identify the boundary 303 of a window. This allows test manager 104 to identify where to resize a window in order to test the capabilities of the window.

The grid 300 process may be used with any type of cursor, such as the arrow cursor, (normal select cursor in windows), a help select cursor, a precision select cursor, a text select cursor, a handwriting cursor, an unavailable cursor, a move cursor, an alternate select cursor, a location select cursor, a person select cursor, and/or the like (e.g., any known cursor type or even new cursor types). The type of actionable graphical object 302 is determined based on the transaction from one type of cursor to another type of cursor may vary based on implementation and/or machine learning.

In one embodiment a grid 300 may not be used. For example, the test manager 104 may just move the cursor in a defined pattern that does not use a grid to detect changes in the cursor.

Figure 4:
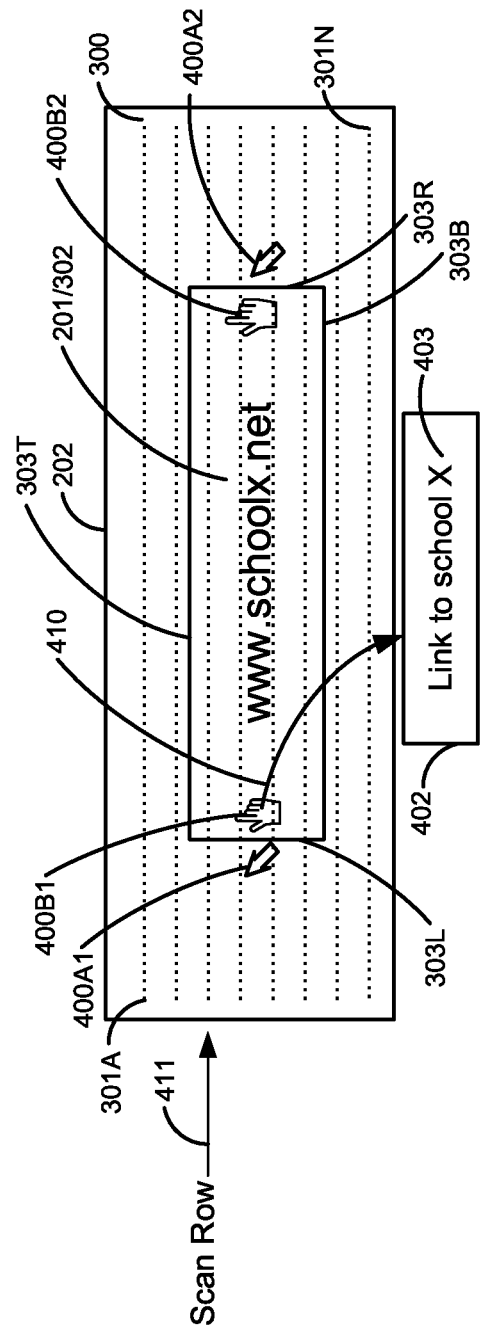
FIG. 4 is a diagram of a how an actionable graphical object's boundary is identified and how pop-up/tool-tip window text can be used to help identify an actionable graphic object type.

FIG. 4 is a diagram of a how an actionable graphical object's boundary 303 is identified and how pop-up/tool-tip window text 403 can be used to help identify an actionable graphical object type. FIG. 4 comprises an area 202 (e.g., like in FIG. 2) in the graphical user interface 102, a graphical object 201/actionable graphical object 302, and a pop-up/tool-tip window 402. The area 202 comprises the grid 300 and the graphical object 201/actionable graphical object 302. The grid 300 is similar to the grid 300 of FIG. 3. The grid 300 comprises the grid elements 301A-301N. The graphical object 201/actionable graphical object 302 has a boundary that comprises 1) a top boundary 303T, a bottom boundary 303BB, a left boundary 303L, and a right boundary 303R. Although the object 201/302 is shown as having a rectangular boundary, it may instead have a boundary that is shaped differently (e.g., an oval or a custom shape).

In FIG. 4, the scanning process is described where the scanning is moving left to right on the scan row 411. As the process start on scan row 411, the arrow cursor 400A1 is displayed. As the arrow cursor 400A1 crosses the left boundary 303L the cursor 400 changes from the arrow cursor 400A1 to the link cursor 400B1 (shaped like a hand). This indicates the left boundary 303L of the actionable graphical object 302 has been crossed. As the scanning process continues from left to right, the link cursor 400B2 changes from the link cursor 400B2 to the arrow cursor 400A2 as the link cursor 400B2 crosses the right boundary 303R. A similar process can be used in the vertical direction to identify the top boundary 303T and the bottom boundary 303BB of the graphical object 201/actionable graphical object 302 using column scanning. Alternatively, if a row of grid elements 301 does not show a cursor change (e.g., the row above the scan row 411) and the row below shows a cursor change, this may be used to identify the top boundary 303T. Likewise, a similar process can be used to identify the bottom boundary 303BB, but in the opposite direction.

In addition, the actionable graphical object 302 may have an associated pop-up/tool-tip window 402 that is displayed in step 410 when the left boundary 303L is crossed. As the left boundary 303L is crossed, the pop-up/tool-tip window 402 is displayed. The test manager 104 may get the pop-up/tool-tip window text 403 and use it in various ways. For example, the test manager 104 may use the pop-up/tool-tip window text 403 to help identify a type of actionable graphical object 302. The pop-up/tool-tip window text 403 may indicate a type of the actionable object 302 is as show in FIG. 4 (a link actionable graphical object 302). The pop-up/tool-tip window text 403 may also be used with test results. For example, the pop-up/tool-tip window text 403 (or a portion of the pop-up-window text 403) may be displayed when reporting test results associated with the actionable graphical object 302.

Machine Learning may be used to learn over time what pop-up/tool-tip window text 403 indicates what type of actionable graphical object 302 is being used based on the pop-up/tool-tip window text 403. For example, user input may be used to define a type for the actionable graphical object 302. The Machine Learning algorithm may learn over time that specific words/text in the pop-up/tool-tip window text 403 are associated with specific types of actionable graphical objects 302.

Figure 5:
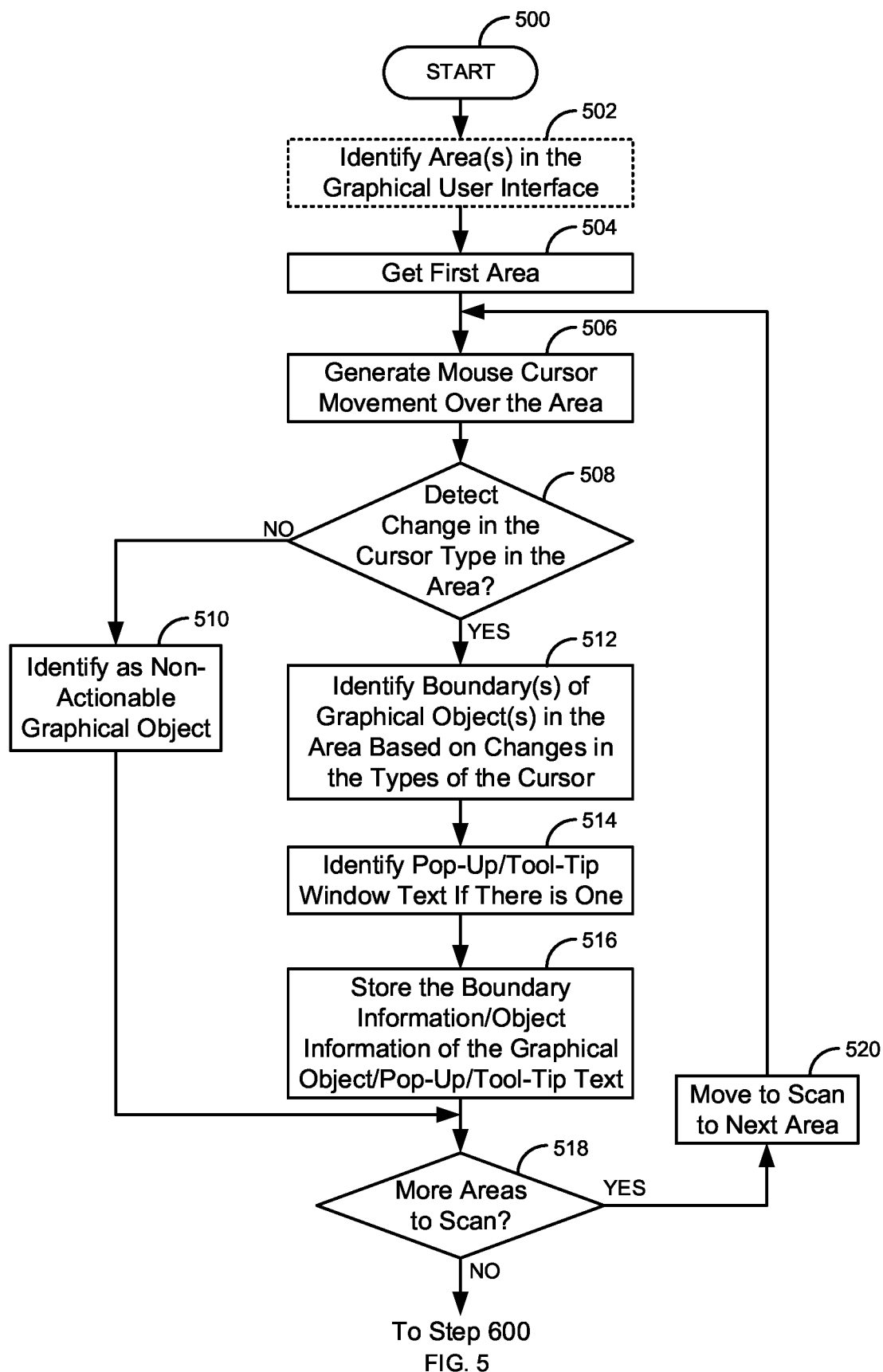
FIG. 5 is a flow diagram of a process for identifying area(s) in a graphical user interface that may have actionable graphical objects.
Figure 6:
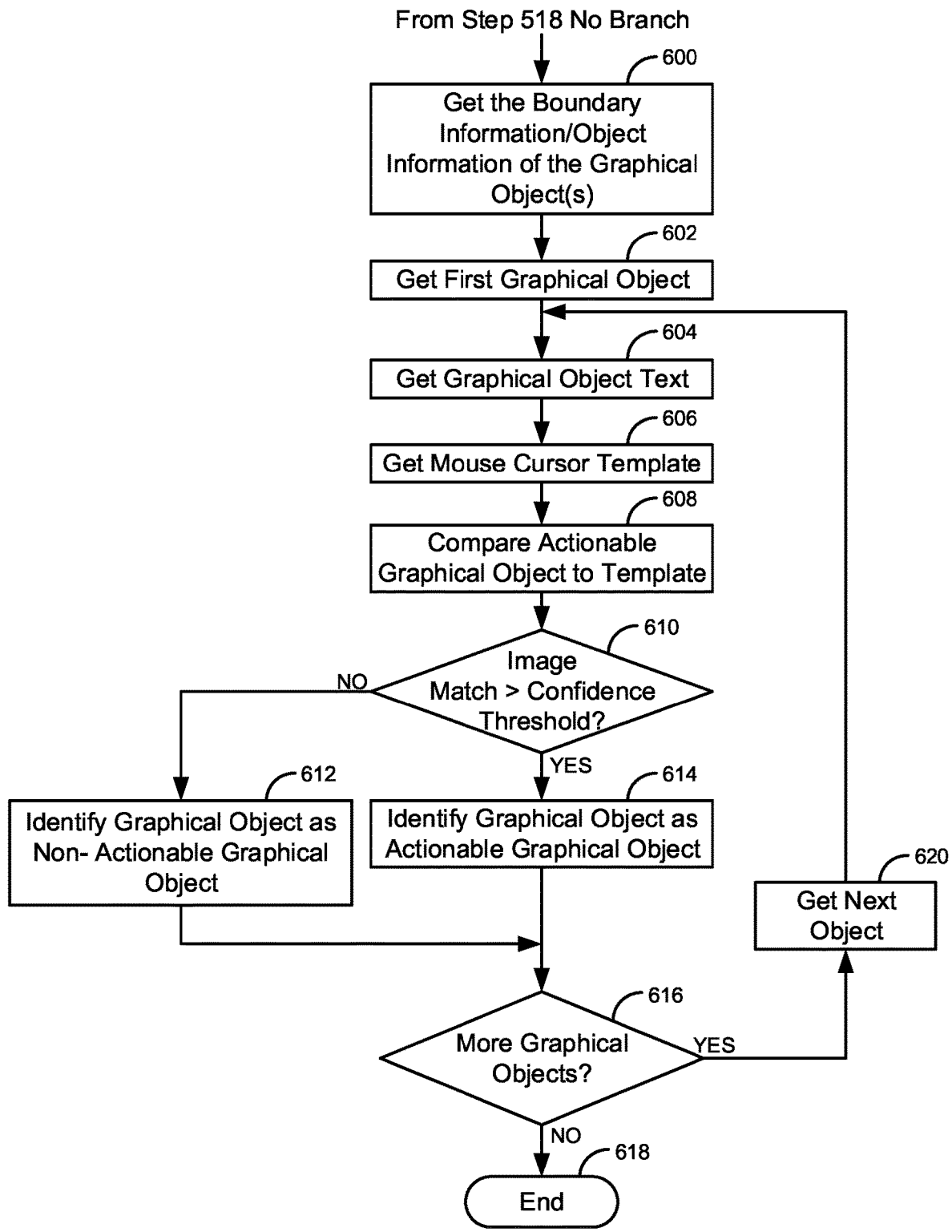
FIG. 6 is a flow diagram of a process for determining if a graphical object is an actionable graphical object for testing.

FIG. 5 is a flow diagram of a process for identifying area(s) 202 in a graphical user interface 102 that may have actionable graphical objects 302. Illustratively, the test communication device 101, the graphical user interface 102, the image capture system 103, the test manager 104, the machine learning module 105, the server 120, and the application under test 121 are stored-program-controlled entities, such as a computer or microprocessor, which performs the method of FIGS. 5-6 and the processes described herein by executing program instructions stored in a computer readable storage medium, such as a memory (i.e., a computer memory, a hard disk, and/or the like). Although the methods described in FIGS. 5-6 are shown in a specific order, one of skill in the art would recognize that the steps in FIGS. 5-6 may be implemented in different orders and/or be implemented in a multi-threaded environment. Moreover, various steps may be omitted or added based on implementation.

The process starts in step 500. The test manager 104 identifies, in step 502, area(s) 202 in the graphical user interface 102. The identification of the area(s) 202 (e.g., areas 202A-202U) may be based on machine learning as described herein using the machine learning module 105. In one embodiment, step 502 may not be implemented. In this embodiment, the graphical interface 102 is considered an area 202 and there is only a single area 202.

The test manger 104 gets, in step 504, the first area 202. The test manager 104 generates cursor movement over the area 202 in step 506. For example, actionable graphical objects may be identified using the grid 300 and comparing captured images as the cursor 400 moves according to the grid 300. The test manager 104 determines, in step 508, if a change in the cursor type has been detected (e.g., as described in FIGS. 3-4). If a change to the cursor type has not been detected in step 508, the test manager 104 identifies the graphical object 201 as a non-actionable graphical object 201 in step 510. The process then goes to step 518.

Otherwise, if the test manager 104 detects a change in the cursor type in the area 202, the test manager 104 identifies, in step 512 the boundary(s) 303 of the graphical object(s) 201 based on the changes in the cursor type. The test manager 104 identifies the pop-up/tool-tip window text 403 (if there is an associated pop-up/tool-tip window 402) in step 514. The test manager 104 stores the boundary information/ object information of the graphical object 201/pop-up/tool-tip window text 403 in step 516.

The test manager 104, determines, in step 518, if there are more areas 202 to scan. If there more areas 202 to scan in step 518, the test manager 104 moves the scan process to scan the next area 202 (i.e., if there are multiple areas 202) in step 520. The process then repeats the scanning process in step 506. Otherwise, if there are no more areas 202 to scan in step 518, the process goes to step 600 of FIG. 6.

FIG. 6 is a flow diagram of a process for determining if a graphical object 201 is an actionable graphical object 302 for testing. The process starts in step 600 where the test manager 104 gets the boundary information/object information of the graphical object(s) 201. The test manager 104 gets, in step 602, the first graphical object 201. The test manager 104 gets the graphical object text (if there is text in the graphical object 201) in step 604. For example, the text of the graphical object 201 of FIG. 4 is "www.schoolx.net."

The test manager 104 gets a mouse cursor template in step 606. The mouse cursor template may include graphical types of various types of graphical objects 201 (e.g., buttons, check boxes, sliders, scroll bars, tabs, text fields, text areas, etc.). There may be different types of the same type of graphical object 201. For example, there may be different images of different types of buttons that are used to determine what type of object the graphical object 201 is in order to properly test the graphical object 201. The test manager 104 compares the image of the graphical object 201 to see if it is similar to any graphical objects 201 in the mouse cursor template in step 608. The mouse cursor template/ threshold may also consider the boundary 300 of the graphical object 201 (e.g., dimensions/shape), the text within the graphical object 201, the pop-up/tool-tip text 403, and/or the like in determining if the graphical object 201 is an actionable graphical object 302.

If the test manager 104 determines, in step 610, that the image of the graphical object 201 is greater than the threshold (or may be equal to), the test manger 104 identifies the graphical object 201 as an actionable graphical object 302 in step 614. The process then goes to step 616. Otherwise, if the test manager 104 determines, in step 610 that the confidence score is less than (or may be equal to) the threshold for the graphical object 201 is identified as a non-actionable graphical object 201 in step 612 and the process goes to step 616.

The test manager 104, determines, in step 616, if there are more graphical objects 201. If there are more graphical objects 201, the test manager 104 gets, in step 620, the next object. The process then goes back to step 604. Otherwise, if there are no more graphical objects 201 in step 616, the process ends in step 618.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
    a microprocessor; and
    a non-transitory computer readable medium, coupled with the microprocessor and storing microprocessor readable and executable instructions that, when executed by the microprocessor, cause the microprocessor to:
    apply a machine learning process to a graphical user interface (GUI) of an application under test (AUT), the machine learning process configured to identify a plurality of areas of the GUI that respectively include a plurality of graphical objects, the machine learning process configured to identify each graphical object as either actionable or non-actionable;
    for each area of the plurality of areas of the GUI identified by the machine learning process:
        generate a cursor movement in the area of the GUI, wherein the cursor movement uses a scanning process in the area to a detect a change in a cursor type;
        in response to the scanning process of the cursor movement detecting the change in the cursor type, identify the graphical object in the area as actionable; and
        in response to the scanning process of the cursor movement not detecting the change in the cursor type, identify the graphical object in the area as non-actionable; and
    test the graphical objects of the areas of the GUI of the AUT that have been identified as actionable in response to the scanning process of the cursor movement detecting the change in the cursor type.

2. The system of claim 1, wherein for each area in which the graphical object has been identified as being actionable, a type of the graphical object is identified based on a text that is displayed in a pop-up window or tool-tip window when the change in the cursor type is detected.

3. The system of claim 1, wherein for each area in which the graphical object has been identified as being actionable, at least a portion of text associated with a displayed pop-up window or tool-tip window that is associated with the graphical objects is displayed as part of a test result for the graphical object.

4. The system of claim 1, wherein the scanning process uses a grid.

5. The system of claim 4, wherein for each area in which the graphical object has been identified as being actionable, the scanning process identifies a boundary of the graphical object based on the cursor movement using the grid.

6. The system of claim 1, wherein for each area in which the graphical object has been identified as being actionable and is a window, the scanning process discovers a plurality of changes of the cursor, wherein the plurality of changes of the cursor comprises a change to at least two of: a vertical resize cursor, and a horizontal resize cursor.

7. The system of claim 1, wherein for each area in which the graphical object has been identified as being actionable, a type of the graphical object is identified based on the cursor type changing from a first type of cursor to a second type of cursor.

8. The system of claim 7, wherein for each area in which the graphical object has been identified as being actionable and the graphical object is an editable actional graphical object, the second type of cursor is an edit cursor.

9. The system of claim 7, wherein for each area in which the graphical object has been identified as being actionable and the graphical object is a link actional graphical object, the second type of cursor is a link cursor.

10. A method comprising:
    applying, by a microprocessor, a machine learning process to a graphical user interface (GUI) of an application under test (AUT), the machine learning process configured to identify a plurality of areas of the GUI that respectively include a plurality of graphical objects, the machine learning process configured to identify each graphical object as either actionable or non-actionable;
    for each area of the plurality of areas of the GUI identified by the machine learning process:
        generating, by the microprocessor, a cursor movement in the area of the GUI, wherein the cursor movement uses a scanning process in the area to a detect a change in a cursor type;
        in response to the scanning process of the cursor movement detecting the change in the cursor type, identifying, by the microprocessor, the graphical object in the area as actionable; and
        in response to the scanning process of the cursor movement not detecting the change in the cursor type, identifying, by the microprocessor, the graphical object in the area as non-actionable; and
    testing, by the microprocessor, the graphical objects of the areas of the GUI of the AUT that have been identified as actionable in response to the scanning process of the cursor movement detecting the change in the cursor type.

11. The method of claim 10, wherein for each area in which the graphical object has been identified as being actionable, a type of the graphical object is identified based on a text that is displayed in a pop-up window or tool-tip window when the change in the cursor type is detected.

12. The method of claim 10, wherein for each area in which the graphical object has been identified as being actionable, at least a portion of text associated with a displayed pop-up window or tool-tip window that is associated with the graphical objects is displayed as part of a test result for the graphical object.

13. The method of claim 10, wherein the scanning process uses a grid, and for each area in which the graphical object has been identified as being actionable, the scanning process identifies a boundary of the graphical object based on the cursor movement using the grid.

14. The method of claim 10, wherein for each area in which the graphical object has been identified as being actionable and is a window, the scanning process discovers a plurality of changes of the cursor, wherein the plurality of changes of the cursor comprises a change to at least two of: a vertical resize cursor, and a horizontal resize cursor.

15. The method of claim 10, wherein for each area in which the graphical object has been identified as being actionable, a type of the graphical object is identified based on the cursor type changing from a first type of cursor to a second type of cursor.

16. The method of claim 15, wherein for each area in which the graphical object has been identified as being actionable and the graphical object is an editable actional graphical object, the second type of cursor is an edit cursor.

17. The method of claim 15, wherein for each area in which the graphical object has been identified as being actionable and the graphical object is a link actional graphical object, the second type of cursor is a link cursor.

18. A non-transitory computer readable medium having stored thereon instructions that cause a processor to execute a method comprising:
 applying a machine learning process to a graphical user interface (GUI) of an application under test (AUT), the machine learning process configured to identify a plurality of areas of the GUI that respectively include a plurality of graphical objects, the machine learning process configured to identify each graphical object as either actionable or non-actionable;
 for each area of the plurality of areas of the GUI identified by the machine learning process:
  generating a cursor movement in the area of the GUI, wherein the cursor movement uses a scanning process in the area to a detect a change in a cursor type;
  in response to the scanning process of the cursor movement detecting the change in the cursor type, identifying the graphical object in the area as actionable; and
  in response to the scanning process of the cursor movement not detecting the change in the cursor type, identifying the graphical object in the area as non-actionable; and
 testing the graphical objects of the areas of the GUI of the AUT that have been identified as actionable in response to the scanning process of the cursor movement detecting the change in the cursor type.

19. The non-transitory computer readable medium of claim 18, wherein the scanning process uses a grid, and for each area in which the graphical object has been identified as being actionable, the scanning process identifies a boundary of the graphical object based on the cursor movement using the grid.

20. The non-transitory computer readable medium of claim 18, wherein for each area in which the graphical object has been identified as being actionable, a type of the graphical object is identified based on the cursor type changing from a first type of cursor to a second type of cursor.

* * * * *